May 11, 1954     B. H. NICOLAISEN     2,678,298
EXTRACTIVE DISTILLATION OF HYDRAZINE WITH A GLYCOL
Filed Nov. 15, 1952
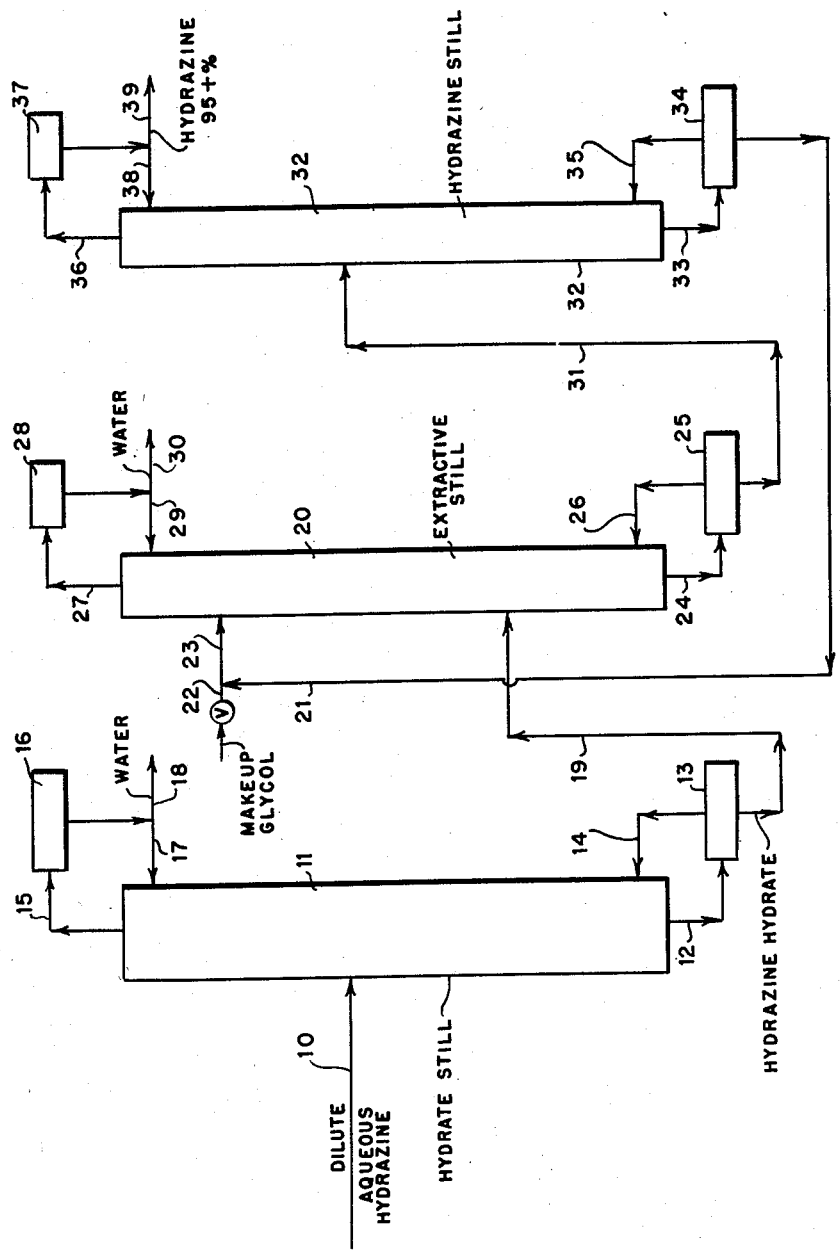
Bernard H. Nicolaisen
INVENTOR
BY
Adams, Forward and McLean
ATTORNEYS Patented May 11, 1954

2,678,298

UNITED STATES PATENT OFFICE 2,678,298

EXTRACTIVE DISTILLATION OF HYDRAZINE WITH A GLYCOL

Bernard H. Nicolaisen, Lewiston, N. Y., assignor to Mathieson Chemical Corporation, a corporation of Virginia Application November 15, 1952, Serial No. 320,689

3 Claims. (Cl. 202—39.5)

My invention relates to a process for the production of substantially anhydrous hydrazine from dilute aqueous hydrazine solutions by extractive distillation.

In the Raschig synthesis hydrazine is obtained as an extremely dilute aqueous solution (about 1 to 3 per cent) by distillation of the reaction mixture. Anhydrous hydrazine has been obtained from the dilute solution usually by one of two general methods. In one group of methods, the base may be absorbed in acid, the salt separated from water and ammonolyzed to obtain anhydrous hydrazine in liquid ammonia. The latter is readily removed to obtain the anhydrous hydrazine product. In another group of processes for the same purpose, the dilute aqueous hydrazine may be fractionated at atmospheric pressure to obtain concentrations up to the azeotropic composition containing 71.5 per cent of hydrazine. Further distillation at atmospheric pressure does not serve to increase the concentration of hydrazine. The resulting so-called hydrazine hydrate may be distilled from caustic soda or other alkalies, usually by multiple distillation, in order to obtain anhydrous hydrazine. These processes are expensive and appreciable hydrazine loss occurs by decomposition on heating over extended periods.

I have found that dilute aqueous hydrazine can be concentrated by extractive distillation in the presence of a glycol as a solvent. Substantially anhydrous hydrazine can be produced by establishing conditions of extractive distillation such that the water is vaporized from the distillation zone while the glycol and substantially anhydrous hydrazine plus minor proportions of water are removed as the liquid bottoms which are then distilled to recover glycol and to vaporize substantially anhydrous hydrazine, e. g. about 95 per cent hydrazine. My process is particularly advantageous in that the anhydrous hydrazine product is recovered as an overhead product. I have found that ethylene glycol is especially advantageous as an extractive solvent for the distillation. Other glycols such as propylene glycol, butylene glycols and diethylene glycols are also useful.

The preferred charge stock for the present invention is hydrazine hydrate or a composition approximating that concentration obtained usually by the atmospheric fractionation of more dilute aqueous hydrazine at atmospheric pressure. Preferably the charge to the process of the present invention contains at least about 60 per cent of hydrazine and not over about 40 per cent of water. Such charge stocks are readily obtained by atmospheric fractionation. More dilute aqueous solutions of hydrazine may be used.

According to the present invention suitable hydrazine hydrate solutions as described above are charged with recycled and make-up glycol to an extractive fractionating column. The glycol is introduced near the top of the column and the aqueous hydrazine at any suitable point but preferably not above the glycol inlet. The column is operated under conditions of extractive distillation including elevated temperature with correlative pressure and solvent-to-charge ratio establishing separation of a vapor fraction comprising substantially pure water and a liquid fraction comprising glycol and hydrazine with minor proportions of water. An excess of glycol to charge, preferably in countercurrent contact, is employed. Suitable proportions of glycol to hydrazine hydrate on a molar basis vary from about 1.25 to 4 to 1.

Heat is conveniently introduced into the bottom of the column by means of a reboiler. Substantially pure water is taken overhead. The top temperature is therefore substantially 100° C. at sea level atmospheric pressure or correspondingly lower temperatures at lower pressures. The bottoms from the extractive column comprise principally glycol and hydrazine in the molar proportions of about 2.5:1 to 11:1 together with minor proportions of water not usually exceeding about 0.1 mole per mole of hydrazine. Since all of the water in these bottoms appears in the final hydrazine product, the temperature control at this point is very important and this temperature should be maintained within a narrow range. However, this range may be between about 160 and 190° C. depending on the ratio of glycol to hydrazine hydrate feed. Higher proportions of glycol produce correspondingly higher bottom temperatures in the extractive column since the composition is richer in the higher boiling glycol component.

The bottoms from the extractive column are then charged to a hydrazine still, which is heated by means of a reboiler, to separate the hydrazine from the glycol. The temperature is controlled so that hydrazine is vaporized overhead and glycol is recovered as bottoms. The bottoms from the still, comprising substantially anhydrous glycol and about 1 to 10 per cent of hydrazine, are advantageously recycled to the extractive column. Substantially anhydrous hydrazine comprising at least 95 per cent hydrazine is taken through a reflux system and obtained as an overhead product.

My invention will be further illustrated by the simplified flow plan of the accompanying drawing. In the illustrated flow, a dilute aqueous hydrazine stream from the synthesis reaction is charged by means of connection 10 to hydrate still 11. Distillation is effected by means of reboiler 13. Hydrazine hydrate is withdrawn as bottoms through connection 12 to reboiler 13. Recirculation to the bottom of still 11 through vapor return line 14 maintains a still bottom temperature of about 122° C., for example. The still top temperature is 100° C. at sea level atmospheric pressure and water vapor is taken overhead through connection 15 and condenser system 16. Reflux may be returned to the top of the still through connection 17 while the net water removed is withdrawn through connection 18.

The hydrazine hydrate produced is withdrawn from reboiler 13 through line 19 and is charged to extractive still 20. Glycol, for example, ethylene glycol, comprising recycle material from line 21 and make-up material added by connection 22 is introduced to an upper portion of extractive still 20 by means of connection 23. A still bottom temperature of about 160°–190° C. is maintained by recirculating bottoms through line 24, reboiler 25 and return line 26. A water vapor stream is taken overhead through connection 27 and condenser system 28. Reflux may be returned to the top of the still through connection 29 while the net water removed is withdrawn through connection 30. The still top temperature is 100° C. at seat level atmospheric pressure. The bottoms from the extractive still 20 consisting substantially of glycol, hydrazine and a minor proportion of water are removed from reboiler 25 through line 31 to the hydrazine still 32 to separate hydrazine. The still is heated by circulation of glycol bottoms through line 33 to reboiler 34 equipped with return line 35 and the temperature is controlled so that hydrazine is vaporized overhead and glycol is recovered as bottoms. The bottom product stream, comprising substantially anhydrous glycol and about 1 to 10 per cent of hydrazine, is recycled by means of line 21 from reboiler 34 to extractive still 20. A vapor stream consisting of substantially anhydrous hydrazine, e. g. at least 95 per cent, is taken overhead by line 36 through a reflux system 37. Reflux may be returned to the still by line 38 and the anhydrous hydrazine product is removed by line 39.

In the hydrazine column, nitrogen or other inert gas is preferably introduced as a blanket to prevent access of air to the anhydrous hydrazine condensate. Suitable inert gases for this purpose include nitrogen, helium, sulfur hexafluoride and the like.

The process of my invention will be further illustrated by the following examples:

Example I

A feed having the following composition in per cent by weight: hydrazine 16.9, water 3.4, ethylene glycol 79.6, and ammonia 0.08, was charged at the rate of 0.0167 gallon per minute to a continuous fractionating tower having the equivalent of 25 theoretical plates. A distillate was taken overhead continuously at a temperature of 99° C. and a pressure of 740 mm. Hg. The distillate comprised in per cent by weight: hydrazine 0.04, water 96.7, ethylene glycol 0.00, and ammonia 3.3. The bottom liquor was maintained at a temperature of 160 to 162° C. A portion continuously withdrawn from the column reboiler had the following composition in per cent by weight: hydrazine 17.2, water 1.0, ethylene glycol 81.8, and ammonia 0.00.

Thus no significant loss of hydrazine occurred in the distillation by carry-over and the residual product had a composition corresponding to about 95 per cent hydrazine based on the hydrazine and water contained therein.

Example II

Bottoms from a distillation similar to that described in Example I and having the following per cent composition by weight: hydrazine 17.72, water 0.99, and ethylene glycol 81.29, was charged to a 2-inch fractionating column having the equivalent of 25 theoretical plates at the rate of 0.0167 gallon per minute. The continuous overhead product averaged about 95 per cent hydrazine. The bottoms were withdrawn continuously and averaged about 91 per cent glycol and 9 per cent hydrazine. They were recycled to the extractive distillation tower.

I claim:

1. A process for the production of substantially anhydrous hydrazine from aqueous hydrazine which comprises subjecting the aqueous hydrazine charge to extractive distillaiton with a glycol solvent under extractive distillation conditions of elevated temperature, pressure and solvent-to-charge ratio establishing separation of a vapor fraction comprising substantially pure water and a liquid fraction comprising glycol and hydrazine substantially free from water, removing and distilling the liquid fraction to recover a vapor fraction comprising substantially anhydrous hydrazine and a liquid fraction comprising glycol solvent.

2. The process of claim 1 in which the glycol is ethylene glycol.

3. The process of claim 1 in which the liquid fraction comprising glycol solvent is returned to the extractive distillation step.

References Cited in the file of this patent

UNITED STATES PATENTS

| Number | Name | Date |
|---|---|---|
| 1,469,447 | Schneible | Oct. 2, 1923 |
| 1,974,069 | Greer | Sept. 18, 1934 |
| 2,413,205 | Word et al. | Dec. 24, 1946 |

FOREIGN PATENTS

| Number | Country | Date |
|---|---|---|
| 563,164 | Great Britain | Aug. 1, 1944 |